US012748543B2

(12) United States Patent
Prasannakumar et al.

(10) Patent No.: US 12,748,543 B2
(45) Date of Patent: Sep. 29, 2026

(54) AUTOMATIC DATA MOVER SELECTION IN INFORMATION PROCESSING SYSTEM ENVIRONMENT

(71) Applicant: Dell Products L.P., Round Rock, TX (US)

(72) Inventors: Pooja Prasannakumar, Bangalore (IN); Thomas L. Watson, Richardson, TX (US)

(73) Assignee: Dell Products L.P., Round Rock, TX (US)

( * ) Notice: Subject to any disclaimer, the term of this patent is extended or adjusted under 35 U.S.C. 154(b) by 161 days.

(21) Appl. No.: 18/085,681

(22) Filed: Dec. 21, 2022

(65) Prior Publication Data

US 2024/0211157 A1 Jun. 27, 2024

(51) Int. Cl.
*G06F 3/06* (2006.01)

(52) U.S. Cl.
CPC .......... *G06F 3/0647* (2013.01); *G06F 3/0604* (2013.01); *G06F 3/0673* (2013.01)

(58) Field of Classification Search
None
See application file for complete search history.

(56) References Cited

U.S. PATENT DOCUMENTS 11,734,130 B1 * 8/2023 Khanna ............... G06F 11/1469 714/4.11
2004/0098547 A1 * 5/2004 Ofek ................... G06F 11/1464 711/170
2004/0243643 A1 * 12/2004 Hattrup ............... H04L 67/1097
2008/0177958 A1 * 7/2008 Cannon ................. G06F 3/0613 711/161
2016/0162373 A1 * 6/2016 Damgar ................ G06F 3/0671 702/186
2018/0095851 A1 * 4/2018 Zhang ................. G06F 11/2023
2020/0133785 A1 * 4/2020 Yu ........................... G06F 16/14
2021/0120039 A1 * 4/2021 Bett .................... G06F 11/1461
2021/0271577 A1 * 9/2021 Patil .................... G06F 11/1662
2021/0382771 A1 * 12/2021 Schniebel ........... G06F 11/2097
2022/0035551 A1 * 2/2022 Iyer ....................... G06F 3/0683
2022/0164510 A1 * 5/2022 Reid ....................... G06F 30/34
2023/0267052 A1 * 8/2023 Singhal ............... G06F 11/3034 714/6.3
2024/0028533 A1 * 1/2024 Reid ....................... G06F 30/27

OTHER PUBLICATIONS

N. Yehia, "Kubernetes Self Remediation (AKA Poison Pill)," https://www.openshift.com/blog/kubernetes-self-remediation-aka-poison-pill, Nov. 18, 2020, 4 pages.

(Continued)

*Primary Examiner* — Hosain T Alam
*Assistant Examiner* — Ryan Dare
(74) *Attorney, Agent, or Firm* — Ryan, Mason & Lewis, LLP

(57) ABSTRACT

Techniques for application mobility in an information processing system environment are disclosed. For example, a method comprises managing, via an automatic data mover selection controller, a plurality of data movers to select at least one of the plurality of data movers for use in moving data associated with an application program from a first storage location to a second storage location.

20 Claims, 8 Drawing Sheets

(56) References Cited

OTHER PUBLICATIONS

Github, "HPE CSI Driver for Kubernetes," https://github.com/hpe-storage/csi-driver, accessed Feb. 4, 2021, 3 pages.
Github, "Stork—Storage Operator Runtime for Kubernetes," https://github.com/libopenstorage/stork, accessed Feb. 4, 2021, 8 pages.
G. Saenger et al., "Pod Safety, Consistency Guarantees, and Storage Implications," https://github.com/kubernetes/community/blob/master/contributors/design-proposals/storage/pod-safety.md, Oct. 2016, 10 pages.
EMC, "Virtual Data Movers on EMC VNX," White Paper, Mar. 2016, 27 pages.
Dell EMC, "Dell EMC Data Domain Virtual Edition," Installation and Administration Guide, Version 4. 0, 302-005-025, Revision 03, Sep. 2019, 142 pages.
Teradata, "Teradata® Data Mover Best Practices Guide," General Implementation and Configuration, B035-6500-000K, Jun. 2022, 62 pages.

* cited by examiner

AUTOMATIC DATA MOVER SELECTION IN INFORMATION PROCESSING SYSTEM ENVIRONMENT

FIELD

The field relates generally to information processing systems, and more particularly to application mobility management in an information processing system environment.

BACKGROUND

Information processing systems increasingly utilize reconfigurable virtual resources to meet changing user needs in an efficient, flexible and cost-effective manner. For example, computing and storage systems implemented using virtual resources in the form of containers have been widely adopted. Such containers may be used to provide at least a portion of the virtualization infrastructure of a given information processing system. In such implementations, application programs are executed in containers, i.e., containerized applications.

Oftentimes, containerized applications must be moved from one container grouping (cluster) to another container cluster. Movement involves not only moving the configuration of the application from one container cluster to another, but also moving the application data from the storage array backing the original container cluster to the storage array backing the target container cluster. The application can then be brought up on the target container cluster using the configuration and data that have been moved. However, significant challenges arise in managing such application movement in a container environment.

SUMMARY

Illustrative embodiments provide techniques for application mobility in an information processing system environment.

For example, in an illustrative embodiment, a method comprises managing, via an automatic data mover selection controller, a plurality of data movers to select at least one of the plurality of data movers for use in moving data associated with an application program from a first storage location to a second storage location.

In some illustrative embodiments the automatic data mover selection controller, in performing the managing of the plurality of data movers, may: determine one or more volumes accessed by the application program in which the data being moved is stored; cause copying of configuration information associated with the application program to an intermediate storage location; select the at least one of the plurality of data movers for use in moving data associated with the application program from the first storage location to the second storage location based on one or more selection criteria; cause copying of the data associated with the application program from the first storage location to the second storage location using the selected at least one of the plurality of data movers; and cause the application program to access the data copied to the second storage location during subsequent execution.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

Advantageously, illustrative embodiments overcome the significant challenges that arise in managing application movement in an information processing system environment, especially in environments with disparate storage array types and disparate data types being moved.

In one or more illustrative embodiments, an application is executed on a pod on a given node of a container environment. While application mobility techniques according to illustrative embodiments are particularly effective in pod-based container environments, it is to be appreciated that the techniques can be implemented in other information processing system environments.

These and other illustrative embodiments include, without limitation, apparatus, systems, methods and computer program products comprising processor-readable storage media.

DETAILED DESCRIPTION

Figure 1:
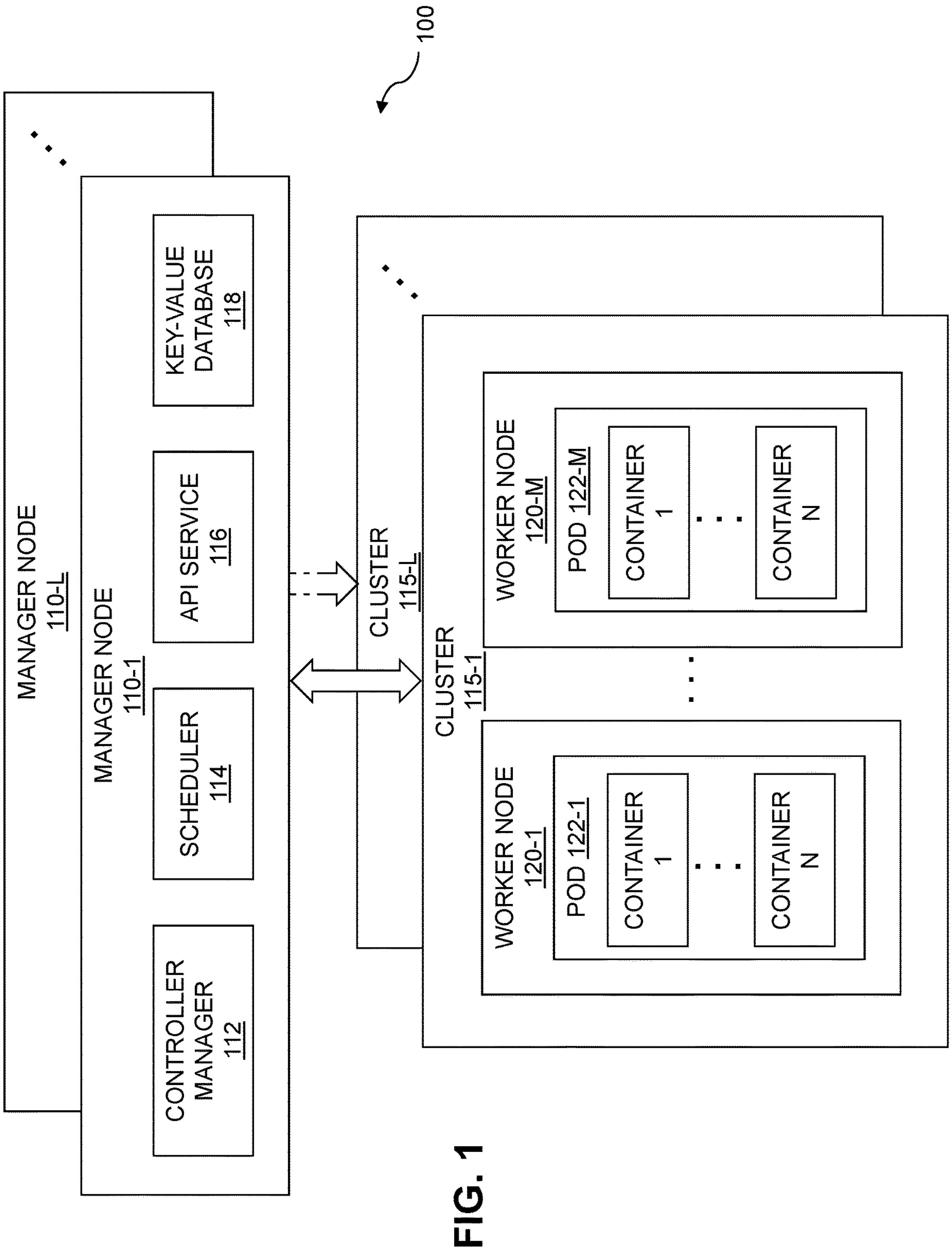
FIG. 1 illustrates a pod-based container environment within which one or more illustrative embodiments can be implemented.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term “information processing system” as used herein is intended to be broadly construed so as to encompass, for example, processing platforms comprising cloud and/or non-cloud computing and storage systems, as well as other types of processing systems comprising various combinations of physical and/or virtual processing resources. An information processing system may therefore comprise, by way of example only, at least one data center or other type of cloud-based system that includes one or more clouds hosting tenants that access cloud resources.

As the term is illustratively used herein, a container may be considered lightweight, stand-alone, executable software code that includes elements needed to run the software code. The container structure has many advantages including, but not limited to, isolating the software code from its surroundings, and helping reduce conflicts between different tenants or users running different software code on the same underlying infrastructure. The term “user” herein is intended to be broadly construed so as to encompass numerous arrangements of human, hardware, software or firmware entities, as well as combinations of such entities.

In illustrative embodiments, containers may be implemented using a Kubernetes container orchestration system. Kubernetes is an open-source system for automating application deployment, scaling, and management within a container-based information processing system comprised of components referred to as pods, nodes and clusters, as will be further explained below in the context of FIG. 1. Types of containers that may be implemented or otherwise adapted within the Kubernetes system include, but are not limited to, Docker containers or other types of Linux containers (LXCs) or Windows containers. Kubernetes has become the prevalent container orchestration system for managing containerized workloads. It is rapidly being adopted by many enterprise-based information technology (IT) organizations to deploy its application programs (applications). By way of example only, such applications may include stateless (or inherently redundant applications) and/or stateful applications. While the Kubernetes container orchestration system is used to illustrate various embodiments, it is to be understood that alternative container orchestration systems, as well as information processing systems other than container-based systems, can be utilized.

Some terminology associated with the Kubernetes container orchestration system will now be explained. In general, for a Kubernetes environment, one or more containers are part of a pod. Thus, the environment may be referred to, more generally, as a pod-based system, a pod-based container system, a pod-based container orchestration system, a pod-based container management system, or the like. As mentioned above, the containers can be any type of container, e.g., Docker container, etc. Furthermore, a pod is typically considered the smallest execution unit in the Kubernetes container orchestration environment. A pod encapsulates one or more containers. One or more pods are executed on a worker node. Multiple worker nodes form a cluster. A Kubernetes cluster is managed by at least one manager node. A Kubernetes environment may include multiple clusters respectively managed by multiple manager nodes. Furthermore, pods typically represent the respective processes running on a cluster. A pod may be configured as a single process wherein one or more containers execute one or more functions that operate together to implement the process. Pods may each have a unique Internet Protocol (IP) address enabling pods to communicate with one another, and for other system components to communicate with each pod. Still further, pods may each have persistent storage volumes associated therewith. Configuration information (configuration objects) indicating how a container executes can be specified for each pod.

FIG. 1 depicts an example of a pod-based container orchestration environment 100. As shown, a plurality of manager nodes 110-1, . . . 110-L (herein each individually referred to as manager node 110 or collectively as manager nodes 110) are respectively operatively coupled to a plurality of clusters 115-1, . . . 115-L (herein each individually referred to as cluster 115 or collectively as clusters 115). As mentioned above, each cluster is managed by at least one manager node.

Each cluster 115 comprises a plurality of worker nodes 120-1, . . . 120-M (herein each individually referred to as worker node 120 or collectively as worker nodes 120). Each worker node 120 comprises a respective pod, i.e., one of a plurality of pods 122-1, . . . 122-M (herein each individually referred to as pod 122 or collectively as pods 122). However, it is to be understood that one or more worker nodes 120 can run multiple pods 122 at a time. Each pod 122 comprises a set of one or more containers 1, . . . N (different pods may have different numbers of containers). As used herein, a pod may be referred to more generally as a containerized workload.

Also shown in FIG. 1, each manager node 110 comprises a controller manager 112, a scheduler 114, an application programming interface (API) service 116, and a key-value database 118, as will be further explained. However, in some embodiments, multiple manager nodes 110 may share one or more of the same controller manager 112, scheduler 114, API service 116, and key-value database 118.

Worker nodes 120 of each cluster 115 execute one or more applications associated with pods 122. For example, in illustrative embodiments, an application runs within a container in a pod 122 and may therefore be referred to as a containerized application. As mentioned herein, such a containerized application may have to be moved, for some operational or other reason, from one cluster 115 to another cluster 115.

Each manager node 110 manages the worker nodes 120, and therefore pods 122 and containers, in its corresponding cluster 115. More particularly, each manager node 110 controls operations in its corresponding cluster 115 utilizing the above-mentioned components, i.e., controller manager 112, scheduler 114, API service 116, and a key-value database 118. In general, controller manager 112 executes control processes (controllers) that are used to manage operations in cluster 115. Scheduler 114 typically schedules pods to run on particular nodes taking into account node resources and application execution requirements such as, but not limited to, deadlines. In general, in a Kubernetes implementation, API service 116 exposes the Kubernetes API, which is the front end of the Kubernetes container orchestration system. Key-value database 118 typically provides key-value storage for all cluster data including, but not limited to, configuration data objects generated, modified, deleted, and otherwise managed, during the course of system operations.

Figure 2:
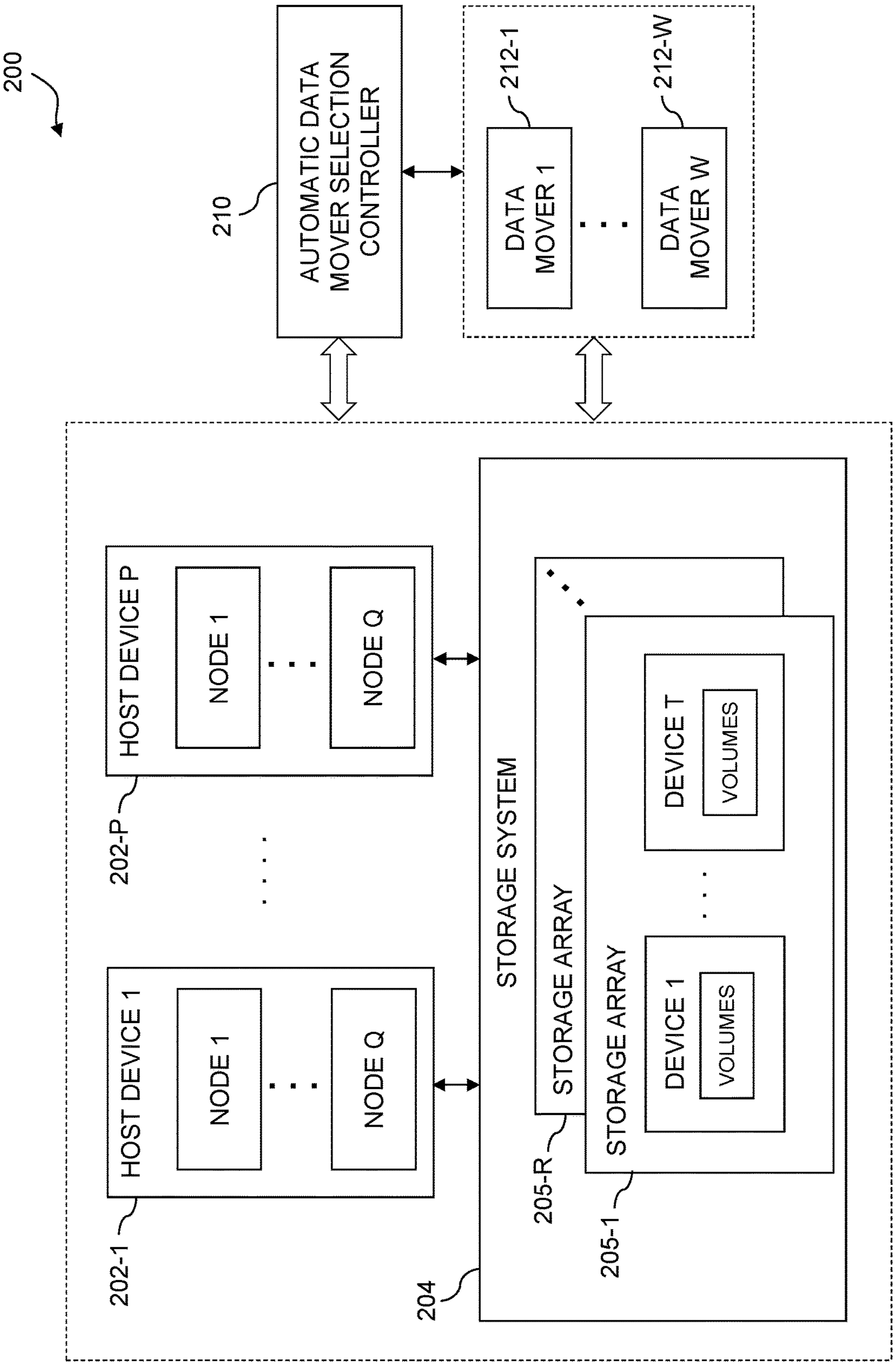
FIG. 2 illustrates host devices and a storage system in an information processing system environment with automatic data mover selection functionality according to an illustrative embodiment.

Turning now to FIG. 2, an information processing system 200 is depicted within which pod-based container orchestration environment 100 of FIG. 1 can be implemented. More particularly, as shown in FIG. 2, a plurality of host devices 202-1, . . . 202-P (herein each individually referred to as host device 202 or collectively as host devices 202) are operatively coupled to a storage system 204. Each host device 202 hosts a set of nodes 1, . . . Q. One non-limiting example of a host device 202 is a server. Note that while multiple nodes are illustrated on each host device 202, a host device 202 can host a single node, and one or more host devices 202 can host a different number of nodes as compared with one or more other host devices 202.

As further shown in FIG. 2, storage system 204 comprises a plurality of storage arrays 205-1, . . . 205-R (herein each individually referred to as storage array 205 or collectively as storage arrays 205), each of which is comprised of a set of storage devices 1, . . . T upon which one or more storage volumes are persisted. The storage volumes depicted in the storage devices of each storage array 205 can include any data generated in the information processing system 200 but, more typically, include data generated, manipulated, or otherwise accessed, during the execution of one or more applications in the nodes of host devices 202.

Furthermore, any one of nodes 1, . . . Q on a given host device 202 can be a manager node 110 or a worker node 120 (FIG. 1). In some embodiments, a node can be configured as a manager node for one execution environment and as a worker node for another execution environment. Thus, the components of pod-based container orchestration environment 100 in FIG. 1 can be implemented on one or more of host devices 202, such that data associated with pods 122 (FIG. 1) running on the nodes 1, . . . Q is stored as persistent storage volumes in one or more of the storage devices 1, . . . T of one or more of storage arrays 205.

Also shown in FIG. 2, information processing system 200 comprises an automatic data mover selection controller 210 operatively coupled to a plurality of data movers 212-1, . . . 212-W (herein each individually referred to as data mover 212 or collectively as data movers 212). As will be explained in further illustrative detail below in the context of respective illustrative embodiments of FIGS. 3 and 4, automatic data mover selection controller 210 is configured to enable automatic selection of a data mover 212 for use in application data mobility within storage system 204. More particularly, automatic data mover selection controller 210 selects (based on one or more criteria to be further explained herein) and uses an appropriate (e.g., best-suited, optimal, preferred, required, etc.) data mover 212 for moving application data from one storage array 205 (e.g., associated with one of clusters 115) to another storage array 205 (e.g., associated with another of clusters 115), as well as for potentially moving application data within the same storage array 205 (e.g., same one of clusters 115) if that is the most appropriate mobility decision.

Note that while automatic data mover selection controller 210 and data movers 212 are illustratively depicted in FIG. 2 as being separate from host devices 202 and storage system 204, it is to be appreciated that, in illustrative embodiments, all or parts of automatic data mover selection controller 210 and data movers 212 can be implemented on one or more of host devices 202, storage system 204, and/or one or more other dedicated or shared computing platforms. In one non-limiting example, automatic data mover selection controller 210 can execute in a pod itself inside a Kubernetes cluster (e.g., 115 in FIG. 1), while data movers 212 can execute in storage arrays 205, or separate entities, possibly also executing as pods in the cluster, or even in other hardware, for example, smart network interface cards (NICs).

In a Kubernetes-based implementation, moving containerized applications from one Kubernetes cluster to another requires moving the configuration of the application, e.g., namespaces, resources, persistent volume claims, objects, images, etc., as well as moving the application data from the source cluster to the target cluster. It is realized that moving the application data is different from backing up and moving the application configuration. Configuration usually involves only a few kilobytes of data while application data could be on the order of terabytes. Moving large amounts of data requires specialized software/technology known as a data mover (e.g., data movers 212). In some instances, data movers can detect blocks of application data that have changed since the last backup and thus back up only the changed blocks (i.e., incremental backups) thus achieving both spatial and temporal efficiencies.

It is realized herein that there are multiple data movers that could be used to move data for containerized applications, a non-limiting list of examples including: (i) Restic is a data management tool designed to back up data; (ii) Dell EMC Data Domain Virtual Edition (DDVE) is a software defined data mover that is part of Dell EMC PowerProtect Data Manager (PPDM) that can back up application data to block or object storage; (iii) Data Domain Storage Direct is a data mover solution used for some storage arrays, such as Dell PowerStore and Dell PowerMax, which exposes array-specific application programming interfaces (APIs) to orchestrate data backup to DDVE; (iv) array-to-array replication can be used as a data mover when the source and target clusters are backed by arrays that are configured for replication; (v) Glider is a data mover solution for storage arrays such as Dell PowerMax that can move data to/from object store; (vi) homogenous array-to-array snapshot shipping can be used, e.g., some arrays such as Dell PowerStore are being configured with the ability to ship snapshots (point in time copies) of volumes to other Powerstore arrays (the process is called snapshipping); and (vii) heterogenous array-to-array snapshot shipping can be used, e.g., there are proposed data mover solutions that aim to ship snapshots (or point in time copies) of volumes across different types of storage arrays (examples include, but are not limited to, SnapDiff and CloudFlow).

It is to be appreciated that the above data mover solutions/technologies are only a few examples of data movers that can constitute data movers 212. Thus, data movers 212 can include some or all of the above-mentioned data movers, one or more other data movers not expressly mentioned herein, and/or various combinations thereof. Embodiments are not intended to be limited to the types of data movers or types of data being moved. That is, automatic data mover selection controller 210 is configured to be able to manage (e.g., select and use) any data movers that are operatively coupled thereto. In some embodiments, the plurality of data movers 212 can be updated (e.g., add one or more data movers, remove one or more data movers, modify one or more data movers) in real-time such that automatic data mover selection controller 210 can dynamically select from the updated plurality of data movers 212. Additionally or alternatively, updating of data movers 212 can be done offline.

Based on one or more of the source and target Kubernetes clusters, the storage arrays that back these clusters, how they are configured, and the type of data (i.e., one or more selection criteria), it is realized herein that different data movers could be selected and used for moving the application data. Each available data mover technology may have differences in performance, e.g., space and time efficiencies. For example, some data movers may require copying the data to an intermediate storage location, often in the cloud. In such a use case, it is realized that selecting the most space efficient technology for data movement is important to keep the costs of cloud storage down. Further, if the data movement does not complete within a specified time, the data may not be available to move or restore the application in the target cluster within the expected time. Thus, choosing a time efficient technology for data movement is also important. Selecting an appropriate data mover also has operational and performance benefits to the underlying physical compute, storage, and network resources of information processing system 200. Accordingly, automatic data mover selection controller 210 is configured to automatically select one or more of data movers 212 to move application data based on one or more of the selection criteria described herein.

Information processing system 200 is assumed to be implemented using at least one processing platform comprising one or more processing devices each having a processor coupled to a memory. Such processing devices can illustratively include particular arrangements of compute, storage, and network resources. In some alternative embodiments, information processing system 200 can be implemented on respective distinct processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of information processing system 200 are possible, in which certain components of the system reside in one data center in a first geographic location while other components of the system reside in one or more other data centers in one or more other geographic locations that are potentially remote from the first geographic location. Thus, it is possible in some implementations of information processing system 200 for portions or components thereof to reside in different data centers. Numerous other distributed implementations of information processing system 200 are possible. Accordingly, the constituent parts of information processing system 200 can also be implemented in a distributed manner across multiple computing platforms.

Additional examples of processing platforms utilized to implement containers, container environments, container management systems, and other information processing system environments in illustrative embodiments, such as those depicted in FIGS. 1 and 2, will be described in more detail below in conjunction with FIGS. 5 and 6.

It is to be appreciated that these and other features of illustrative embodiments are presented by way of example only and should not be construed as limiting in any way.

Accordingly, different numbers, types and arrangements of system components can be used in other embodiments. Although FIG. 2 shows an arrangement wherein host devices 202 are coupled to just one plurality of storage arrays 205, in other embodiments, host devices 202 may be coupled to and configured for operation with storage arrays across multiple storage systems similar to storage system 204.

It is also to be understood that different ones of storage arrays 205 can be configured with different functionalities, interfaces and/or different semantics and can store different data types (e.g., blocks, files, objects, etc.) Storage arrays 205 can also be different storage products (storage families, storage platforms) of one or more different storage vendors, or different storage array families from the same storage vendor.

It should be understood that the particular sets of components implemented in information processing system 200 as illustrated in FIG. 2 are presented by way of example only. In other embodiments, only subsets of these components, or additional or alternative sets of components, may be used, and such components may exhibit alternative functionality and configurations. Additional examples of systems implementing pod-based container management functionality will be described below.

Still further, information processing system 200 may be part of a public cloud infrastructure such as, but not limited to, Amazon Web Services (AWS), Google Cloud Platform (GCP), Microsoft Azure, etc. The cloud infrastructure may also include one or more private clouds and/or one or more hybrid clouds (e.g., a hybrid cloud is a combination of one or more private clouds and one or more public clouds). Portions of information processing system 200 may also be part of one or more edge computing platforms.

It is further realized herein that data protection solutions for Kubernetes or container mobility solutions available today typically offer only a single fixed data mover technology to move the application data, e.g., Velero offers only Restic as the data mover. Hence, these solutions are unable to make use of more efficient data mover technologies even when they are available.

Automatic data mover selection controller 210 overcomes the above and other technical drawbacks with existing application mobility solutions by enabling use of multiple data movers to move application data and further to automatically and intelligently select the most appropriate data mover to move the data for an application based on configurations of the source and target clusters and arrays. For example, automatic data mover selection controller 210 is configured to inspect the source and target cluster and array configurations to determine the available data movers. Determining the data movers can include considering the following queries: (i) could the same array that has the source volumes be used for the target volumes; (ii) is the source volume already being replicated to an array that is accessible to the target cluster; (iii) are the source and target arrays configured for replication, even if this volume is not being replicated; (iv) do the source and target arrays belong to same storage array family; (v) do the source and target arrays support homogenous snapshipping; (vi) do the source and target arrays natively support moving data to/from object store; (vii) do the source and target arrays natively support moving data to/from DDVE via Storage Direct; and/or (viii) do the source and target clusters have any external data mover technologies configured (e.g., SnaffDiff, CloudFlow, PPDM, etc.).

From among the available data movers, automatic data mover selection controller 210 picks the most appropriate one, using a selection algorithm (e.g., as will be illustratively described below in the context of FIGS. 3 and 4), preferring one data mover technology over another using knowledge of the relative space and time efficiencies of each data mover. It is realized that based on the relative efficiencies of each data mover technology for each array platform, the order of preference for one data mover over another may be different for different platforms.

Figure 3:
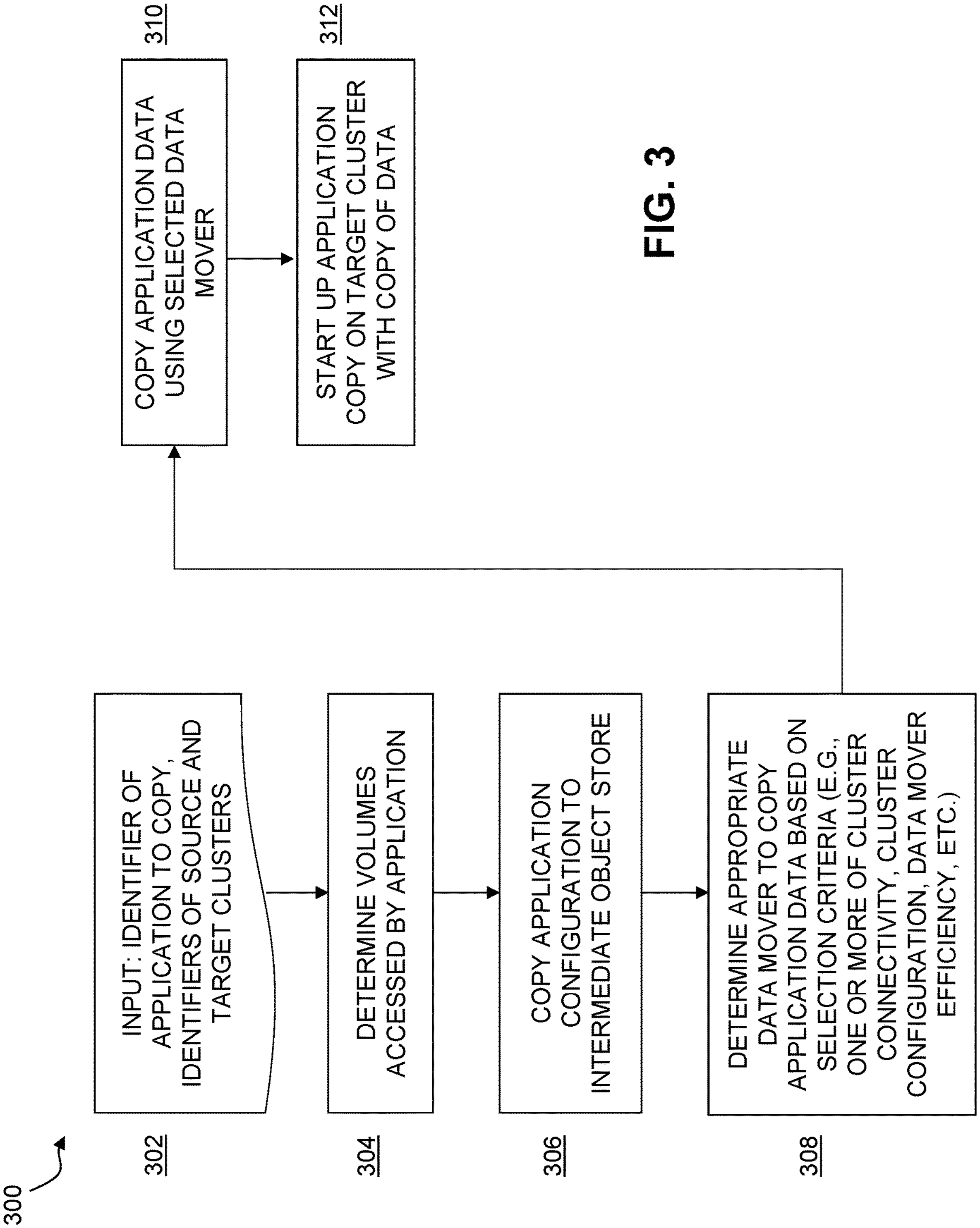
FIG. 3 illustrates an automatic data mover selection process according to an illustrative embodiment.

Referring now to FIG. 3, an automatic data mover selection process 300 that can be implemented by automatic data mover selection controller 210 is depicted. Reference will be made occasionally to components illustrated in FIGS. 1 and 2, however, it is to be understood that automatic data mover selection process 300 can be implemented in any other information processing system environment.

As shown, step 302 receives, as input, an identifier of the application to be copied (moved), as well as identifiers of the source and target clusters (115). Step 304 determines the one or more volumes accessed by the application. Step 306 causes copying of application configuration (e.g., also known as application manifests) to an intermediate object store. Step 308 determines the appropriate data mover (212) to copy application data based on the selection criteria (e.g., one or more of cluster connectivity, cluster configuration, data mover efficiency, etc.). Step 310 causes copying of the application data using the data mover (212) selected in step 308. Step 312 causes startup of the application copy on the target cluster (115) with the application data copied by the selected data mover.

Figure 4:
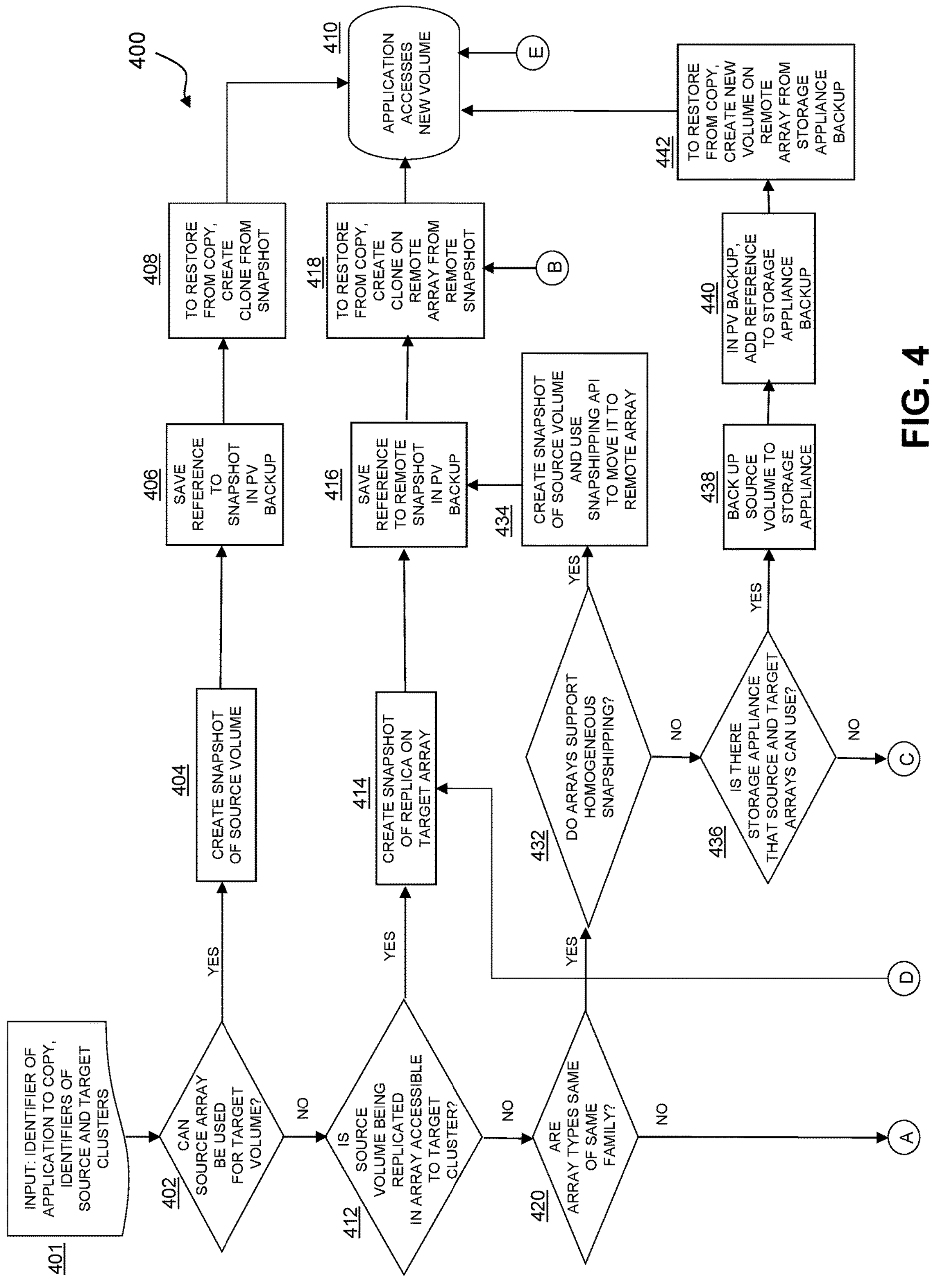
FIG. 4 illustrates an automatic data mover selection process according to another illustrative embodiment.
Figure 4:
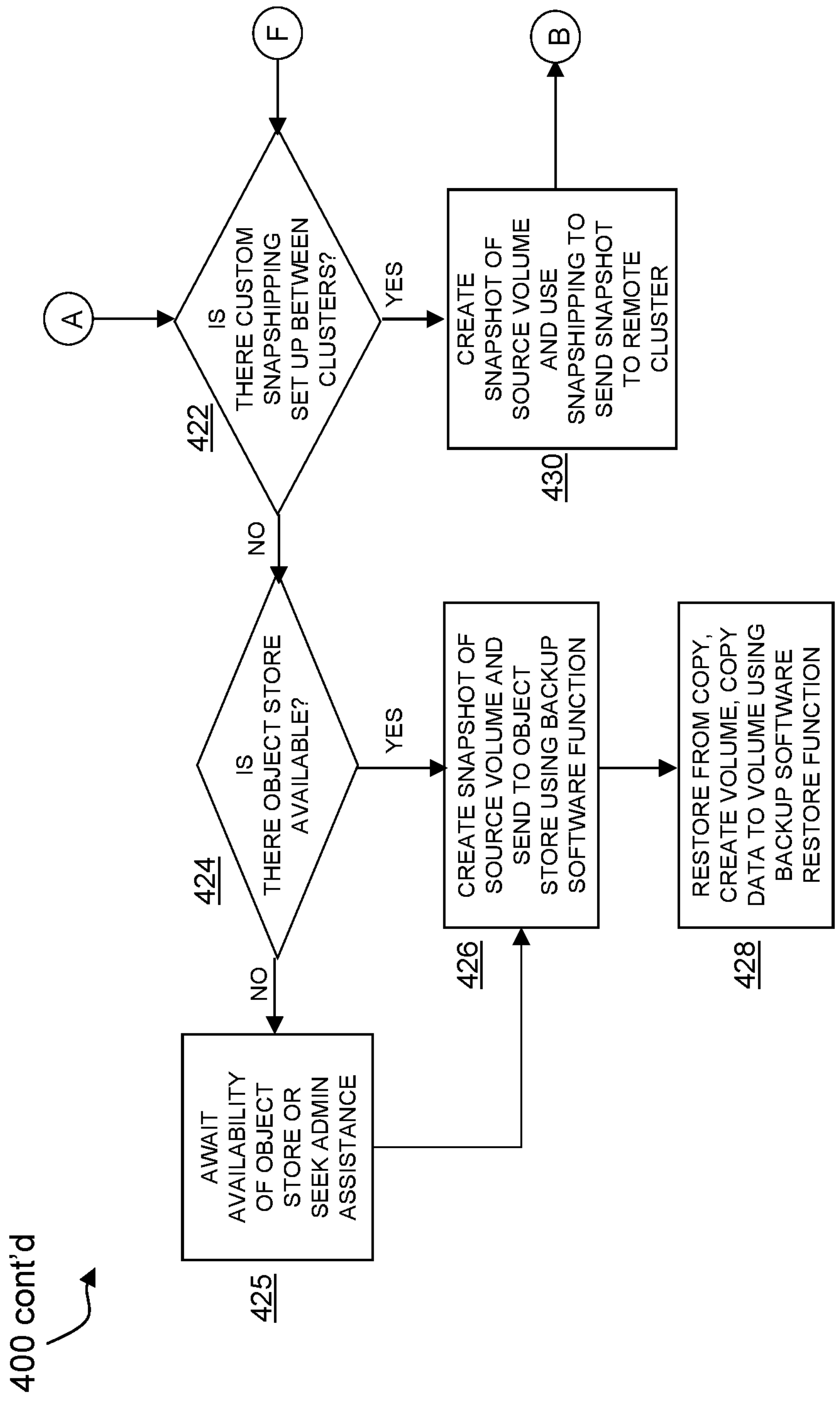
Figure 4:
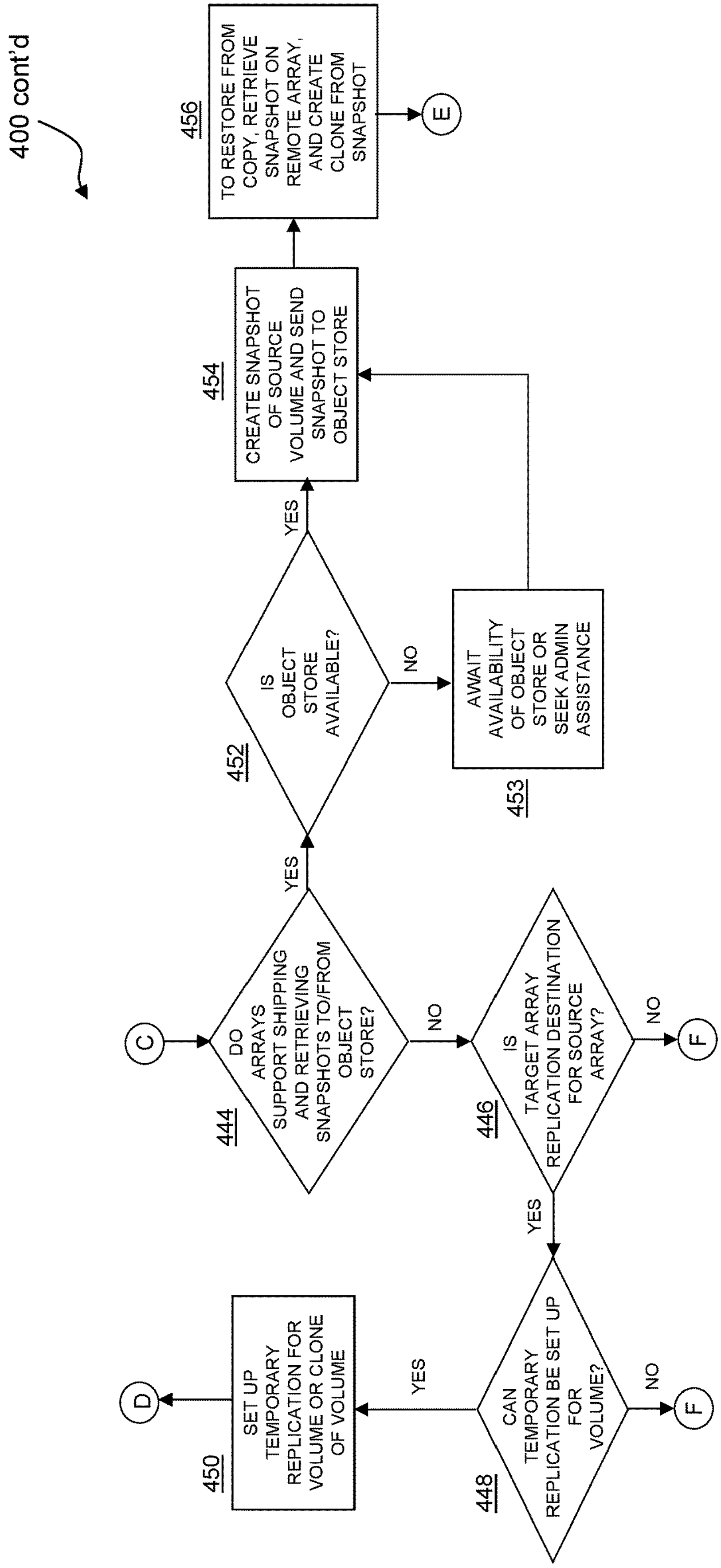

Referring now to FIG. 4, an automatic data mover selection process 400 that can be implemented by automatic data mover selection controller 210 is depicted. Reference again will be made occasionally to components illustrated in FIGS. 1 and 2, however, it is to be understood that automatic data mover selection process 400 can be implemented in any other information processing system environment.

Starting at step 401, automatic data mover selection process 400 receives, as input, an identifier of the application to be copied (moved), as well as identifiers of the source and target clusters.

In step 402, automatic data mover selection process 400 determines whether the source array in which the source volume of the application data is stored can be used for the target volume.

If step 402 is affirmative, then a snapshot of the source volume is created in step 404, and a reference to the snapshot is saved in the persistent volume (PV) backup in step 406. Then, to restore the application data from the copy, step 408 creates a clone on the same array from the snapshot, i.e., the clone represents the target volume. In step 410, the application now accesses the target volume during execution.

If, however, step 402 is negative (i.e., same array cannot be used), then in step 412, automatic data mover selection process 400 determines whether the source volume is being replicated to a target array accessible to the target cluster. If step 412 is affirmative, step 414 creates a snapshot of the replica on the target array. A reference to the remote snapshot is saved in the PV backup in step 416. Then, to restore the application data from the copy, step 418 creates a clone on the remote array from the remote snapshot, i.e., the clone represents the target volume. In step 410, the application now accesses the target volume during execution.

If, however, step 412 is negative (i.e., source volume is not being replicated to a target array accessible to the target cluster), step 420 determines whether the array types are the same or of the same array family. If step 420 is negative, step 422 determines whether custom snapshipping is set up between the clusters. If step 422 is negative, step 424 determines whether an object store is available. If step 424 is negative, automatic data mover selection process 400 awaits an available object store or seeks administrator assistance to connect with an available object store in step 425. If step 424 is affirmative (or following step 425), step 426 creates a snapshot of the source volume and sends the snapshot to the object store using a backup software function (e.g., Restic). Then, step 428 restores the application data from the copy by creating a new volume and copying the data to the new volume using the backup software restore function. The application can then access the new volume. If, however, step 422 is affirmative (i.e., there is a custom snapshipping between the clusters), then step 430 creates a snapshot of the source volume and uses custom snapshipping to send the snapshot to the remote cluster. Then, automatic data mover selection process 400 returns to step 418 and creates a clone on the remote array from the remote snapshot, i.e., the clone represents the target volume. In step 410, the application now accesses the target volume during execution.

Returning to step 420, if affirmative (i.e., array types are the same or of the same array family), step 432 determines whether the arrays support homogeneous snapshipping. If step 432 is affirmative, step 434 creates a snapshot of the source volume and uses the snapshipping API to move the snapshot to the remote array. Then, automatic data mover selection process 400 returns to step 416 where a reference to the remote snapshot is saved in the PV backup. Then, to restore the application data from the copy, step 418 creates a clone on the remote array from the remote snapshot, i.e., the clone represents the target volume. In step 410, the application now accesses the target volume during execution.

If, however, step 432 is negative (i.e., no homogenous snapshipping available), then step 436 determines whether there is a storage appliance (e.g., DDVE) available that the source and target arrays can use. If step 436 is affirmative, step 438 backs up the source volume to the storage appliance and a reference is added in the PV backup to the storage appliance backup in step 440. Then, in step 442, to restore from copy, a new (target) volume is created on the remote array from the storage appliance backup. In step 410, the application now accesses the target volume during execution.

If, however, step 436 is negative (i.e., no storage appliance available), then step 444 determines whether the arrays support shipping and retrieving snapshots to/from an object store. If step 444 is negative, then step 446 determines whether the target array is a replication destination for the source array. If step 446 is affirmative, then step 448 determines whether a temporary replication can be set up for the source volume. If step 448 is affirmative, step 450 sets up a temporary replication for the volume or a clone of volume. Automatic data mover selection process 400 then returns to step 414, follows steps 416 and 418, and the application now accesses the target volume during execution in step 410. Note that if either of steps 446 or 448 are negative, automated data mover selection process 400 returns to step 422.

If, however, step 444 is affirmative (i.e., arrays support shipping and retrieving snapshots to/from an object store), step 452 determines whether an object store is available. If step 452 is negative, automatic data mover selection process 400 awaits an available object store or seeks administrator assistance to connect with an available object store in step 453. If step 452 is affirmative (or following step 453), step 454 creates a snapshot of the source volume and sends the snapshot to the object store. Step 456 then retrieves the snapshot on the remote array and creates the clone from the snapshot to restore from the copy. The application now accesses the clone during execution in step 410.

It is to be appreciated that were there is a decision point in automatic data mover selection process 400 that does not specify a second decision choice, it can be assumed that automatic data mover selection process 400 returns to one of the earlier decision points and proceeds to another path and/or notifies an administrator to seek further input or action. It is also to be appreciated that automatic data mover selection process 400 is one exemplary representation of how automatic data mover selection controller 210 can be configured to provide automatic data mover selection and use given a non-limiting example of different storage array types and/or data types that are implemented in information processing system 200. Alternative automatic data mover selection processes according to other embodiments can depend on the specific storage array types and/or data types that are implemented in other information processing systems.

Accordingly, as illustratively explained herein, an application mobility process using automatic data mover selection orchestrates the movement or cloning of an application from the cluster where it is currently running to another cluster. In illustrative summary for a Kubernetes container-based implementation, this process comprises determining the resources to move, i.e., both configuration as well as the storage volumes which contain the data. The process then copies the application configuration by backing up Kubernetes resources (e.g., namespaces, deployments, pods, persistent volume claims, etc.) that make up the application configuration to an intermediate storage location. The application is then quiesced or temporarily paused and a snapshot(s) of the volume(s) that holds the data for the application is taken. Note that the application data will eventually be copied from this snapshot(s). The application is then resumed or unquiesced. For each volume that holds the data for the application, the process determines the optimal data mover to use for moving the data to the target cluster and array. The selected data mover technology is used to move the application data. This may involve copying the data to an intermediate location using the data mover, and then from the intermediate location to the target, or the data mover may be able to copy data directly from the source array to the target array. In the intermediate storage location, information can be added to indicate which data mover was used to move data for each volume. Once the configuration and data for all volumes are backed up, they are restored to the target cluster. When restoring the data, for each volume, the data mover technology used to back up the data is determined, and the data is restored to the new volumes in the target cluster using the same data mover technology.

Advantageously, as described herein, illustrative embodiments provide technical solutions to Kubernetes administrators or application developers who want to move the containerized applications from one Kubernetes cluster to another but cannot be expected to know the relative efficiencies of the different data mover technologies available. Without the automatic and intelligent selection of the most efficient data mover, the responsibility of selecting the appropriate data mover to use would fall to the users (e.g., administrators). These users are typically not adequately equipped to make this decision and might pick an inefficient data mover thus increasing the space and/or time required for the data movement. Another alternative is to only offer a single data mover to move application data, which is a sub-optimal solution. This is the option that application mobility solutions that exist currently have taken. It is possible that the different volumes used by the application are backed by different storage arrays. The optimal data mover for a volume can depend, inter alia, on the source and target arrays. Hence, the selection of the data mover to use needs to happen per volume. Accordingly, illustrative embodiments pick the most appropriate data mover for moving application data for each volume. Embodiments are extensible to support other data movers not yet considered, and to support other storage platforms. Embodiments can be implemented in various computing platforms including, but not limited to, standard Kubernetes or any variations such as, for example, Mirantis, OpenShift, Rancher, Tanzu, etc.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for automatic data mover selection and use will now be described in greater detail with reference to FIGS. 5 and 6. Although described in the context of systems and processes of FIGS. 1-4, these platforms may also be used to implement at least portions of other information processing systems in other embodiments.

Figure 5:
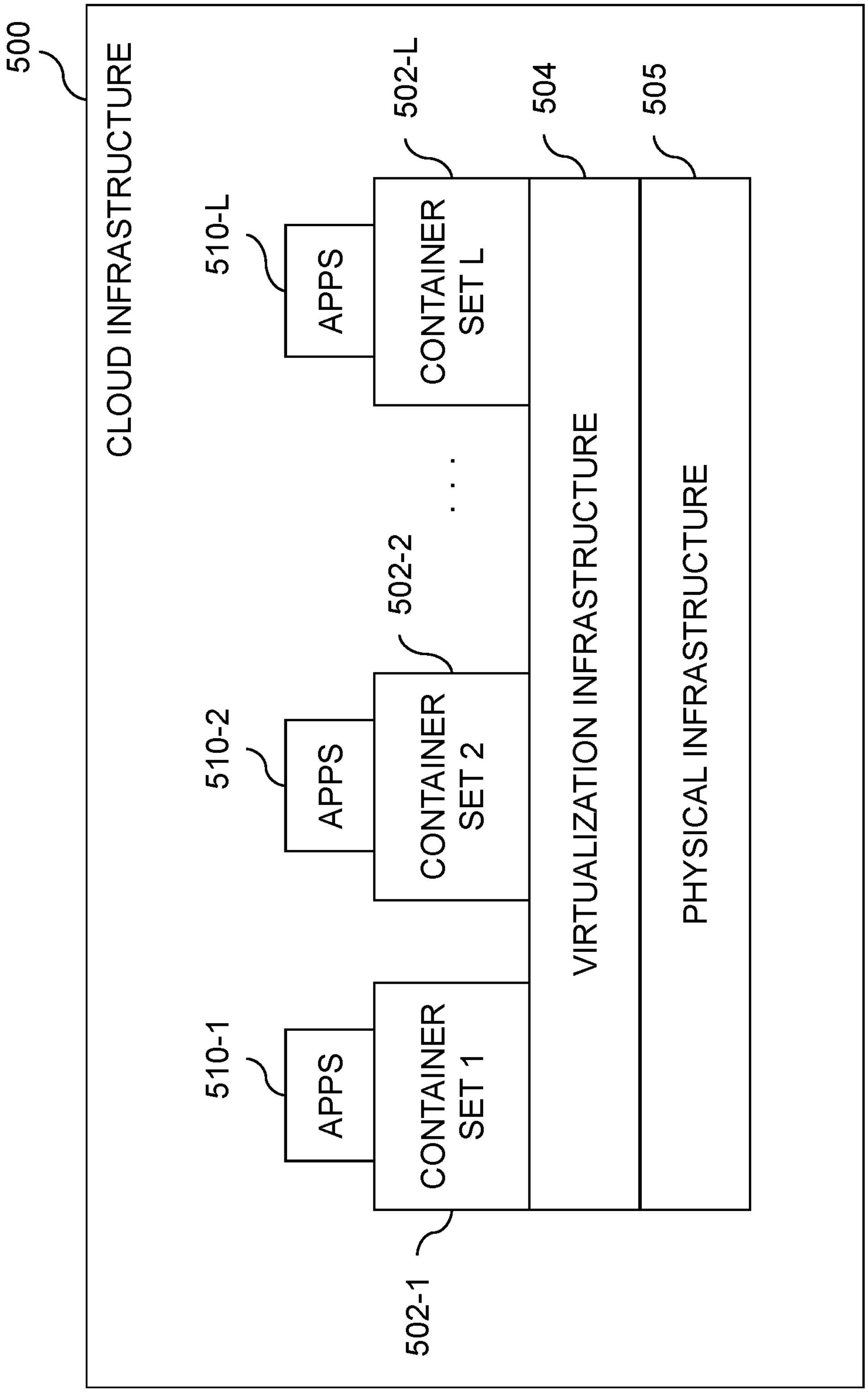
FIGS. 5 and 6 show examples of processing platforms that may be utilized to implement at least a portion of an information processing system with automatic data mover selection functionality according to an illustrative embodiment.
Figure 6:
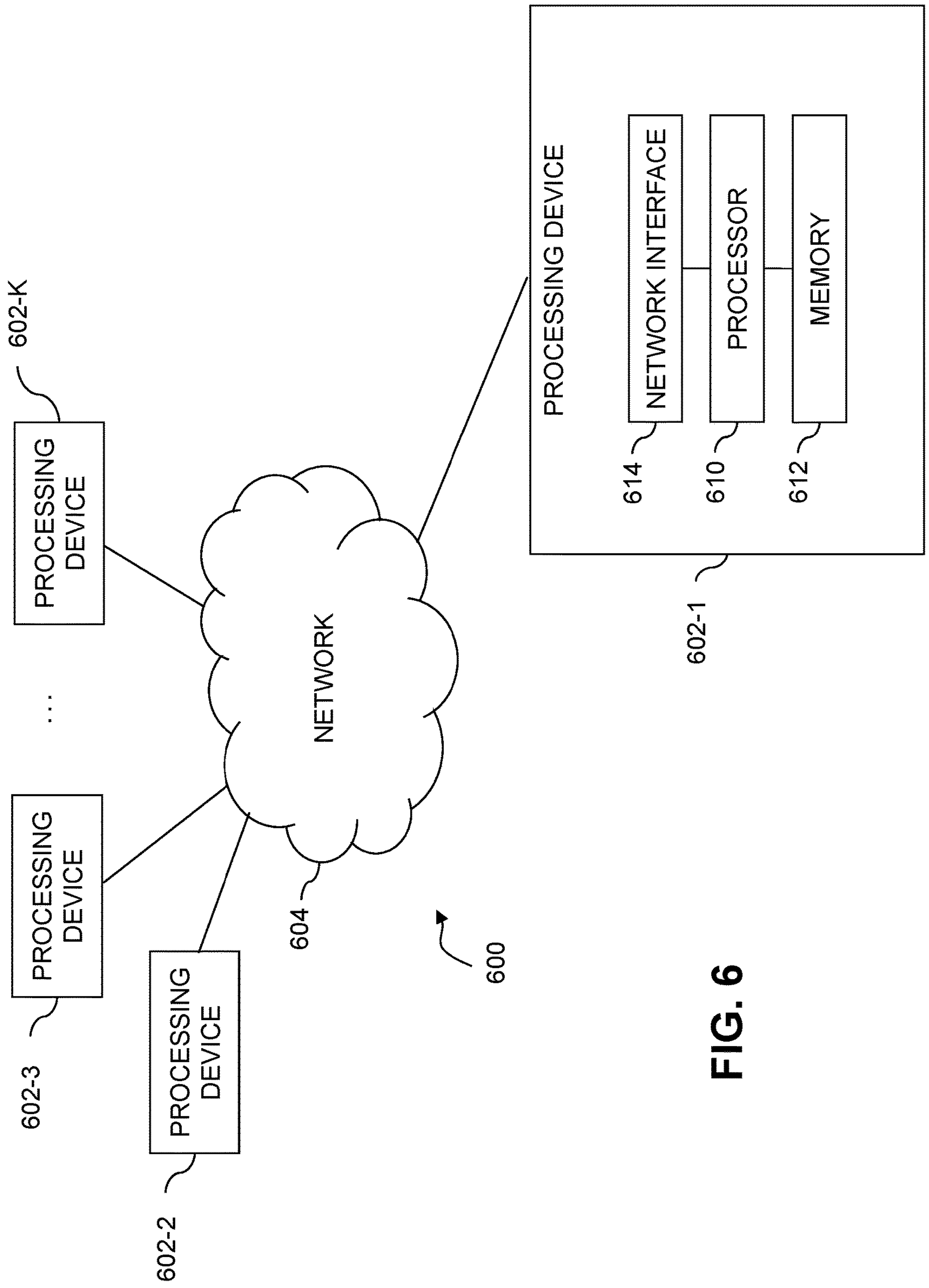

FIG. 5 shows an example processing platform comprising cloud infrastructure 500. The cloud infrastructure 500 comprises a combination of physical and virtual processing resources that may be utilized to implement at least a portion of the information processing systems described herein (e.g., 100/200). The cloud infrastructure 500 comprises multiple container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure.

The cloud infrastructure 500 further comprises sets of applications 510-1, 510-2, . . . 510-L running on respective ones of the container sets 502-1, 502-2, . . . 502-L under the control of the virtualization infrastructure 504. The container sets 502 may comprise respective sets of one or more containers.

In some implementations of the FIG. 5 embodiment, the container sets 502 comprise respective containers implemented using virtualization infrastructure 504 that provides operating system level virtualization functionality, such as support for Kubernetes-managed containers.

As is apparent from the above, one or more of the processing modules or other components of system 100/200 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100/200 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and systems and processes of FIGS. 1-4 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality as disclosed herein are illustratively implemented in the form of software running on one or more processing devices.

The particular processing operations and other system functionality described in conjunction with the diagrams described herein are presented by way of illustrative example only, and should not be construed as limiting the scope of the disclosure in any way. Alternative embodiments can use other types of processing operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments are presented for purposes of illustration only. Many variations and other alternative embodiments may be used. For example, the disclosed techniques are applicable to a wide variety of other types of information processing systems, host devices, storage systems, container monitoring tools, container management or orchestration systems, container metrics, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing platform comprising at least one processor coupled to at least one memory, the at least one processing platform, when executing program code, is configured to implement an automatic data mover selection controller, wherein the automatic data mover selection controller is configured to:

manage a plurality of data movers to select at least one of the plurality of data movers for use in moving data associated with an application program from a first storage location to a second storage location, the data comprising application data associated with the application program and configuration information associated with the application program, the selecting comprising:

using a selection algorithm of the automatic data mover selection controller, based on an identifier of the application program, an identifier of the first storage location, an identifier of the second storage location, and one or more selection criteria comprising at least a space efficiency and a time efficiency of each data mover of the plurality of data movers, to select a first data mover of the plurality of data movers for use in moving the application data associated with the application program; and using the selection algorithm of the automatic data mover selection controller, based on the identifier of the application program, the identifier of the first storage location, the identifier of the second storage location, and the one or more selection criteria comprising at least the space efficiency and the time efficiency of each data mover of the plurality of data movers to select a separate second data mover of the plurality of data movers, the selection of the second data mover being performed separate from the selection of the first data mover, for use in moving the configuration information associated with the application program from the first storage location to the second storage location.

2. The apparatus of claim 1, wherein the automatic data mover selection controller, in performing the managing of the plurality of data movers, is further configured to receive at least an identifier of the application program for which the data being moved is associated and an identifier of the second storage location.

3. The apparatus of claim 1, wherein the application program is associated with a container executing in a first cluster and the first storage location comprises a storage location associated with the first cluster.

4. The apparatus of claim 3, wherein the second storage location comprises one of a storage location associated with the first cluster and a storage location associated with a second cluster.

5. The apparatus of claim 4, wherein the storage location associated with the first cluster and the storage location associated with the second cluster comprise one or more storage arrays.

6. The apparatus of claim 5, wherein the one or more storage arrays associated with the first storage location and the second storage location comprise one or more storage arrays of the same type or of different types.

7. The apparatus of claim 1, wherein the automatic data mover selection controller, in performing the managing of the plurality of data movers, is further configured to determine one or more volumes accessed by the application program in which the data being moved is stored.

8. The apparatus of claim 7, wherein the automatic data mover selection controller, in performing the managing of the plurality of data movers, is further configured to cause copying of the configuration information associated with the application program to an intermediate storage location.

9. The apparatus of claim 1, wherein the one or more selection criteria comprise one or more of criteria associated with cluster connectivity, cluster configuration, data mover efficiency, data type, and storage array type.

10. The apparatus of claim 1, wherein the automatic data mover selection controller, in performing the managing of the plurality of data movers, is further configured to cause copying of the data associated with the application program from the first storage location to the second storage location using the selected at least one of the plurality of data movers.

11. The apparatus of claim 10, wherein the automatic data mover selection controller, in performing the managing of the plurality of data movers, is further configured to cause the application program to access the data copied to the second storage location during subsequent execution.

12. The apparatus of claim 1, wherein the automatic data mover selection controller is further configured to operate in a pod-based container environment.

13. A method comprising:

managing, via an automatic data mover selection controller, a plurality of data movers to select the plurality of data movers for use in moving at least one of data associated with an application program from a first storage location to a second storage location, the data comprising application data associated with the application program and configuration information associated with the application program, the selecting comprising:

using a selection algorithm of the automatic data mover selection controller, based on an identifier of the application program, an identifier of the first storage location, an identifier of the second storage location, and one or more selection criteria comprising at least a space efficiency and a time efficiency of each data mover of the plurality of data movers, to select a first data mover of the plurality of data movers for use in moving the application data associated with the application program; and using the selection algorithm of the automatic data mover selection controller, based on the identifier of the application program, the identifier of the first storage location, the identifier of the second storage location, and the one or more selection criteria comprising at least the space efficiency and the time efficiency of each data mover of the plurality of data movers to select a separate second data mover of the plurality of data movers, the selection of the second data mover being performed separate from the selection of the first data mover, for use in moving the configuration information associated with the application program from the first storage location to the second storage location;

wherein the automatic data mover selection controller is implemented on a processing platform comprising at least one processor, coupled to at least one memory, executing program code.

14. The method of claim 13, wherein the automatic data mover selection controller, in performing the managing of the plurality of data movers, determines one or more volumes accessed by the application program in which the data being moved is stored.

15. The method of claim 14, wherein the automatic data mover selection controller, in performing the managing of the plurality of data movers, causes copying of the configuration information associated with the application program to an intermediate storage location.

16. The method of claim 13, wherein the one or more selection criteria comprise one or more of criteria associated with cluster connectivity, cluster configuration, data mover efficiency, data type, and storage array type.

17. The method of claim 13, wherein the automatic data mover selection controller, in performing the managing of the plurality of data movers, causes copying of the data associated with the application program from the first storage location to the second storage location using the selected at least one of the plurality of data movers.

18. The method of claim 17, wherein the automatic data mover selection controller, in performing the managing of the plurality of data movers, causes the application program to access the data copied to the second storage location during subsequent execution.

19. A computer program product comprising a non-transitory processor-readable storage medium having stored therein program code of one or more software programs, wherein the program code when executed by at least one processing platform causes the at least one processing platform to:

manage, via an automatic data mover selection controller, a plurality of data movers to select at least one of the plurality of data movers for use in moving at least one of data associated with an application program from a first storage location to a second storage location, the data comprising application data associated with the application program and configuration information associated with the application program, the selecting comprising:

using a selection algorithm of the automatic data mover selection controller, based on an identifier of the application program, an identifier of the first storage location, an identifier of the second storage location, and one or more selection criteria comprising at least a space efficiency and a time efficiency of each data mover of the plurality of data movers, to select a first data mover of the plurality of data movers for use in moving the application data associated with the application program; and using the selection algorithm of the automatic data mover selection controller, based on the identifier of the application program, the identifier of the first storage location, the identifier of the second storage location, and the one or more selection criteria comprising at least the space efficiency and the time efficiency of each data mover of the plurality of data movers to select a separate second data mover of the plurality of data movers, the selection of the second data mover being performed separate from the selection of the first data mover, for use in moving the configuration information associated with the application program from the first storage location to the second storage location.

20. The computer program product of claim 19, wherein the one or more selection criteria comprise one or more of criteria associated with cluster connectivity, cluster configuration, data mover efficiency, data type, and storage array type.

* * * * *